United States Patent [19]

Goloff

[11] 4,073,221

[45] Feb. 14, 1978

[54] LIGHT-WEIGHT PISTON ASSEMBLIES

[75] Inventor: Alexander Goloff, East Peoria, Ill.

[73] Assignee: Caterpillar Tractor Co., Peoria, Ill.

[21] Appl. No.: 697,896

[22] Filed: June 21, 1976

[51] Int. Cl.$^2$ .................... F16J 1/00

[52] U.S. Cl. .................... 92/221; 92/220; 92/257

[58] Field of Search .................... 92/220, 221, 213, 216, 92/217, 257; 277/189.5

[56] References Cited

U.S. PATENT DOCUMENTS

| | | | |
|---|---|---|---|
| 549,170 | 11/1895 | Tripold | 92/257 X |
| 1,548,329 | 8/1925 | Nelson | 92/220 X |
| 1,572,325 | 2/1926 | Smith | 92/220 X |
| 2,806,750 | 9/1957 | Gehres | 92/220 X |
| 2,996,341 | 8/1961 | Daub | 277/189.5 |
| 3,029,112 | 4/1962 | Boyle | 92/220 |
| 3,520,234 | 7/1970 | Hill et al. | 92/220 |

FOREIGN PATENT DOCUMENTS

| | | | |
|---|---|---|---|
| 882,780 | 7/1953 | Germany | 92/217 |
| 375,613 | 6/1932 | United Kingdom | 92/220 |
| 558,562 | 1/1944 | United Kingdom | 277/189.5 |

*Primary Examiner*—Irwin C. Cohen

*Attorney, Agent, or Firm*—Wegner, Stellman, McCord, Wiles & Wood

[57] ABSTRACT

An improved piston assembly including a generally cylindrical piston body having a crown and a depending skirt and being formed of a light-weight metal, an annular ring groove protection band formed of a hard metal disposed about the body adjacent the crown and having at least one peripheral groove adapted to receive a compression ring, and securing devices including a plurality of elongated threaded fasteners clampingly securing the band to the body, the threaded fasteners extending longitudinally of the body and having a length sufficient to store substantial clamping energy whereby the components of the assembly will not loosen during use of the assembly.

1 Claim, 6 Drawing Figures

LIGHT-WEIGHT PISTON ASSEMBLIES

BACKGROUND OF THE INVENTION

This invention relates to light-weight piston assemblies and, more specifically, to improved piston assemblies having piston bodies formed of light-weight metal and hard metal ring groove protection bands.

Prior art of possible relevance includes French Pat. No. 634,700 issued Nov. 30, 1927 to Ceskomoravska-Kolben Akciova Spolecnost and the following U.S. Pat. Nos.: 1,547,687 issued July 28, 1925 to Rohwer; 1,547,737 issued July 28, 1925 to Daiber; 2,266,192 issued Dec. 16, 1941 to Grieshaber; 2,349,919 issued May 30, 1944 to Starr; 2,361,095 issued Oct. 24, 1944 to Harrah; 2,398,577 issued April 16, 1946 to Bratzel; 2,478,179 issued Aug. 9, 1949 to Brockmeyer; 2,759,461 issued Aug. 21, 1956 to Maybach et al; 2,807,247 issued Sept. 24, 1957 to Cramer; 3,215,130 issued Nov. 2, 1965 to Maier; 3,380,556 issued Apr. 30, 1968 to Whitehead; and 3,385,175 issued May 28, 1968 to Meier et al.

The advantages of light-weight piston assemblies in reciprocating mechanisms, particularly engines, have long been recognized. In general, such piston assemblies are formed principally of light-weight metal such as aluminum or aluminum alloys and are typically provided with a ring groove protection band formed of a hard metal, such as cast iron, which carries one or more compression rings. The use of such bands has been necessary to provide long life to the piston assemblies in that, as is well known, during operation of reciprocating mechanisms embodying such piston assemblies, the minute movement which the piston rings undergo during the operation of the reciprocating mechanism would cause rapid deterioration of ring-receiving grooves if the grooves were formed directly in the light-weight, and generally softer, piston body.

One approach to the manufacture of such composite piston assemblies is to cast the ring groove protection band in the piston body. This approach requires that the material of which the body is formed have a coefficient of thermal expansion very nearly equal to that of the material forming the band so that the band will not loosen within the body as operating temperatures of the reciprocating mechanism change during operation.

As a practical matter, this approach also requires that very sophisticated inspection techniques be employed to check the soundness of the metallurgical bond between the piston body and the band immediately after fabrication and before installation in a reciprocating mechanism to ensure that the bond will not fail and shorten the useful life of the mechanism.

A variety of other approaches have been used, as exemplified by the above cited prior art. For example, frequently, ring grooves are carried by portions of the piston crown which is formed of a hard metal and secured by any of a variety of means to a light-weight skirt. This approach tends to minimize the advantages accompanying light-weight piston assemblies in that, in lieu of a relatively small hard metal band, the entire crown is formed of a hard and relatively dense metal so that a heavier piston assembly results.

Moreover, when such an approach has been employed, generally relatively short threaded fasteners have been used to secure the crown to the piston skirt and such threaded fasteners are easily overstressed when tightened to the degree necessary to ensure that "creep" between the parts will not occur during operation. Such overstressing inevitably results in premature failure of the assembly.

The above-identified Starr patent employs still another approach employing a single elastic washer which is clamped against a band, the washer being intended to store a clamping energy to be directed against the band to hold the same in place. This approach has not met with a great deal of success since the washer is easily overstressed if it is sufficiently stiff and if not stiff, cannot store sufficient energy to maintain the parts in a solidly clamped configuration.

SUMMARY OF THE INVENTION

It is the principal object of the invention to provide a new and improved light-weight piston assembly. More specifically, it is an object of the invention to provide an improved piston assembly wherein the piston body may be formed of a light-weight material and a ring groove protection band formed of a hard metal and employing mechanical fasteners to maintain the same in a secure relation for a variety of operating positions without potential for overstressing of the components and eliminating the need for sophisticated inspection techniques during the manufacturing process.

An exemplary embodiment of the invention achieves the foregoing objects in a piston assembly including a generally cylindrical piston body having a crown and a depending skirt and formed of a light-weight metal. A ring-shaped, ring groove protection band formed of a hard metal is disposed about the body adjacent the crown and has at least one peripheral groove adapted to receive a compression ring. Means, including a plurality of elongated, threaded fasteners, are provided for clampingly securing the band to the body. The threaded fasteners extend longitudinally of the body and have a length sufficient to store substantial clamping energy whereby the components of the assembly will not loosen during use thereof.

In a highly preferred embodiment, the piston body has a piston rod receiving cavity and a transverse wrist pin receiving bore. The threaded fasteners extend longitudinally within the body at least from the band to the bore and are positioned to be in noninterfering relation with a wrist pin received in the bore or a piston rod received in the cavity.

In one embodiment, the band is cast in the piston body and the threaded fasteners are threaded into the band. In such an embodiment, it is preferred that the threaded fasteners extend to the bottom of the skirt.

In a preferred embodiment, the band includes radially inwardly directed bosses receiving the threaded fasteners so that its mass is minimized, thereby reducing the mass of the overall assembly. The body may also include hollow bosses within the cavity with the threaded fasteners extending through the bosses.

In another embodiment, the body includes a peripheral recess adjacent the crown and opening toward the crown. The band is received in the recess and the securing means further include an annular retainer in the recess clamping the band therein. Threaded fasteners apply a clamping force to the annular retainer.

In one embodiment, the threaded fasteners are threaded into the retainer, while in another embodiment, the threaded fasteners have heads bearing against the retainer.

In still another embodiment of the invention, the piston body also includes a peripheral recess opening toward the crown but the band is disposed in the recess and the threaded fasteners are threadably received in the band.

Other objects and advantages will become apparent from the following specification taken in connection with the accompanying drawings.

DESCRIPTION OF THE PREFERRED EMBODIMENTS

Figure 1:
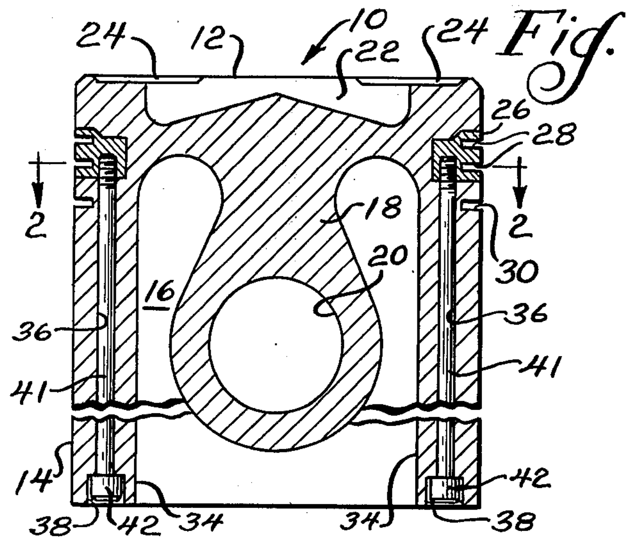
FIG. 1 is a sectional view of one embodiment of a piston assembly made according to the invention.
Figure 2:
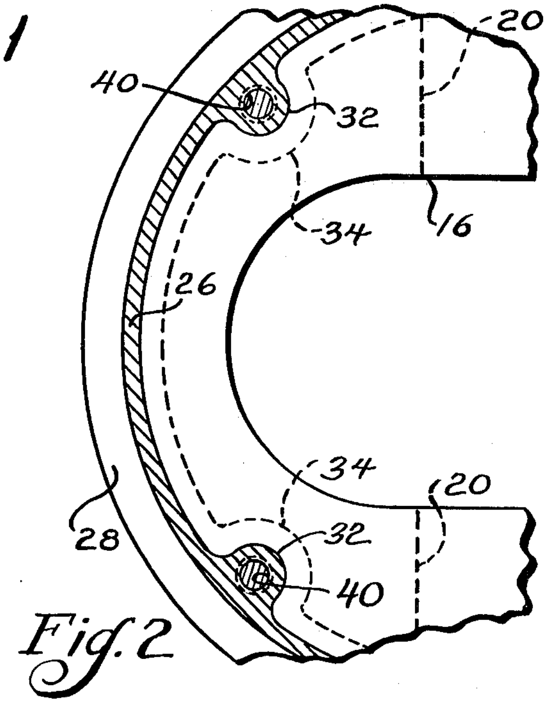
FIG. 2 is an enlarged, fragmentary sectional view taken approximately along the line 2—2 in FIG. 1.

One embodiment of a piston assembly made according to the invention is illustrated in FIGS. 1 and 2 and is seen to include a piston body, generally designated 10, which is generally cylindrical in configuration, formed of a light-weight metal, as aluminum, and has an upper crown 12 and a depending skirt 14. The interior of the body 10 is hollow to define a cavity 16 for receipt of a piston rod. Bosses 18 depending from the crown are provided with a bore 20 for receipt of a wrist pin by which a piston rod may be fastened to the piston.

The crown 12 is provided with a crater 22 shaped to optimize combustion and recesses 24 located to provide clearance between the crown 12 and valves in the mechanism in which the piston may be employed.

Immediately adjacent the crown 12, and cast into the body 10 is a ring-shaped, annular ring groove protection band 26, formed of a hard metal, such as cast iron, and provided with at least one radially outwardly opening peripheral groove 28 for receipt of a corresponding number of compression rings. Just below the band 26, the body 10 is provided with a peripheral, radially outwardly opening groove 30 for receipt of an oil ring.

As seen in FIG. 2, the band 26 is provided with a plurality of inwardly directed bosses 32. It will also be seen that the cavity 16 is elongated near the upper end of the cavity to accommodate the throw of the piston rod and that the bosses 32 are spaced to either side thereof. It will also be seen that the bosses 32 are to each side of the wrist pin receiving bore 20 so as to be in noninterfering relation with both the piston rod and the wrist pin by which such rod is secured to the piston.

The piston body 10 includes elongated, longitudinally extending bosses 34 which extend radially inwardly into the cavity 16 and which also are in noninterfering relation with the components received therein. The bosses 34 include axial bores 36 and terminate at the bottom of the skirt in recesses 38. Threaded fasteners 41 in the form of cap screws extend through the bosses 34 to be threadably received in threaded bores 40 in the bosses 32. The heads 42 of the fasteners 41 abut the bottom of the recesses 38. Thus, the threaded fasteners 41 can be tightened to apply a substantial clamping force to the band 26. For typical threaded fasteners having a nominal diameter of 0.25 inches, several thousand pounds of clamping force can be applied.

It is significant to note the length of the threaded fasteners 41. In most instances, where high clamping forces are desired, the threaded fasteners 41 will extend at least from the band 26 to some point immediately adjacent the bottom of the skirt 14. In light duty uses, a lesser length may be tolerated but, in general, it is desirable that the threaded fasteners have a length to extend at least from the band 26 to the wrist pin receiving bore 20.

The assembly illustrated in FIGS. 1 and 2 is manufactured by casting the band 26 in the piston body in the usual fashion. However, no special effort need be made to provide rigorous control over the thermal coefficients of expansion of the two parts or to ensure a good metallurgical bond between the band 26 and the body 10.

After the casting is completed, the bores 36 may be formed in the bosses 34 and the threaded bores 40 formed in the bosses 32. The threaded fasteners 41 may then be inserted in place and tightened to provide desired clamping force. The piston body may then be finish machined including the machining of the grooves 28 in the band 26.

It is to be noted that it is preferred that the grooves 28 be machined in the band 26 after the clamping force has been applied so as to eliminate the possibility of distortion thereof due to the stresses placed on the band 26 by the threaded fasteners 41. By forming the grooves 28 after the clamping force has been applied, the grooves are essentially machined in after the various stresses are locked into the assembly. Since the piston body will maintain its original geometry during temperature changes since the body will have its temperature changed generally uniformly, the grooves 28 will maintain their initial geometry during operation of the mechanism in which the assembly is used.

Figure 3:
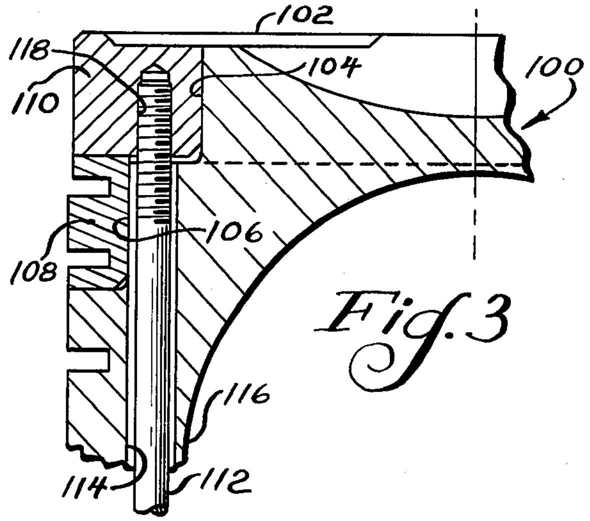
FIG. 3 is an enlarged, fragmentary view of a modified embodiment of the invention.

FIG. 3 illustrates a modified embodiment including a piston body 100 which may be generally identical to the piston body 10 except as specifically described hereinafter. The side of the body 100 adjacent the crown 102 is provided with a stepped groove having a first step 104 and a second step 106, which groove opens to the crown 102. A ring groove protection band 108 of doughtnut-like or annular configuration is disposed about the body in the groove on the step 106 and an annular retainer 110 is abutted against the upper side of the band 108 within the step 104. Retainer 110 may be formed of a light-weight metal, while, like the band 26, the band 108 will be formed of a hard metal. Threaded fasteners 112 extend through bores 114 in bosses 116 identical in configuration to the bores 36 and bosses 34, described previously, to be threadably received in threaded bores 118 in the retainer 110. The threaded fasteners 112 will have a length as described previously and will apply a substantial clamping force to the band 108 via the retainer 110.

Figure 4:
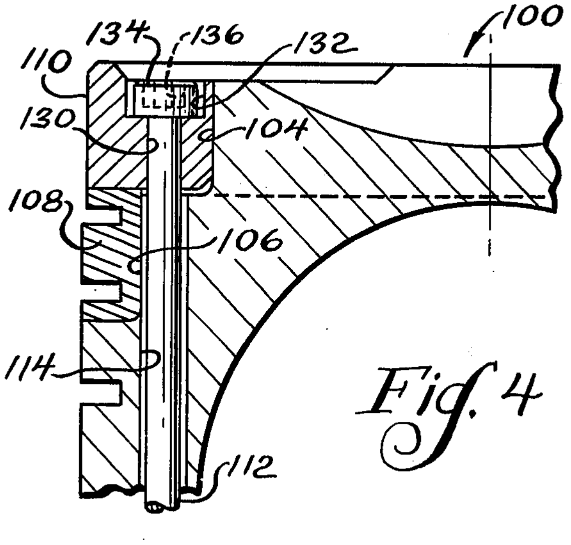
FIG. 4 is an enlarged, fragmentary sectional view of still another embodiment of the invention.

FIG. 4 illustrates still a further modified embodiment of the invention which, in most respects, is identical to that of FIG. 3, differing only in those hereinafter noted.

In lieu of the threaded bore 118 in the retainer 110, the same is provided with an unthreaded bore 130 and a cylindrical recess 132. The head 134 of the threaded retainer 112 is received in the recess 132 while the threaded end (not shown) is received in nuts (not shown) at the remote ends of the bores 114. Depending upon the clamping forces to be employed, it may be necessary to employ washers interposed between such nuts and the body 100.

The heads 134 are provided with an upwardly opening, hexagonal recess 136 by which the fasteners 112 may be removed. The embodiment illustrated in FIG. 4 thus has the advantage over that shown in FIG. 3 in that the assembly may be serviced merely by removing the head of the reciprocating mechanism with which it is employed.

Figure 5:
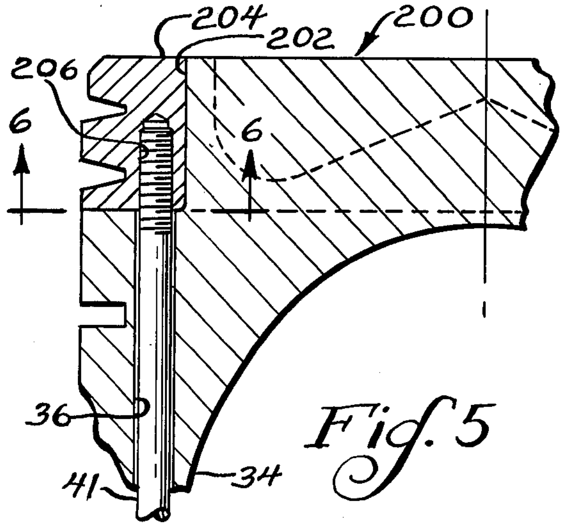
FIG. 5 is an enlarged, fragmentary sectional view of still another embodiment of the invention.
Figure 6:
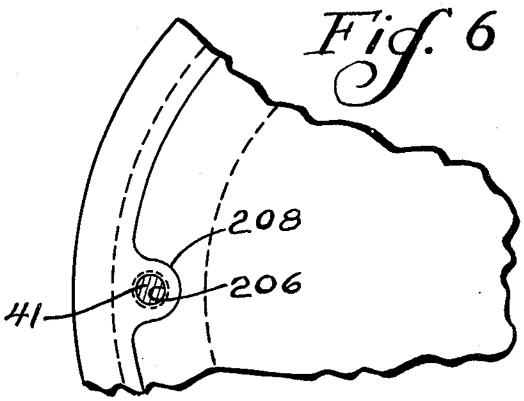
FIG. 6 is a sectional view taken approximately along the line 6—6 of FIG. 5.

FIGS. 5 and 6 illustrate still a further embodiment of the invention which is particularly suited for use where pistons having a high top ring location, which maximizes engine performance with minimum emissions and oil consumption, are required. The piston body 200 is provided with an annular recess 202 at the upper end thereof and a hard metal ring groove protection band 204 is received therein. Threaded fasteners 41 extend through bores 36 in bosses 34 to be threadably received in threaded bores 206 located inwardly directed bosses 208 (FIG. 6) to clampingly retain the band 204 in place.

It is to be noted that the use of the bosses, whether on the bands, or on the piston body, or both, in the various embodiments in a highly desired feature. Through the use of such bosses, the inner diameter of the band or the piston skirt can be maximized at all locations other than those whereat the fasteners are employed. Consequently, the mass of both the piston body and the band is minimized to thereby maximize the advantages of light-weight piston assemblies in reciprocating mechanisms in which the assemblies are to be employed.

It is also to be observed that if desired, the threaded fasteners employed in the embodiment illustrated in FIGS. 5 and 6 can have their heads at the crown of the piston, as illustrated in FIG. 4.

From the foregoing, it will be appreciated that piston assemblies made according to the invention eliminate the difficulties heretofore present in similar assemblies in terms of assuring a good metallurgical bond between the components. The inventive piston assemblies, by means of employing long threaded fasteners, allow the application of substantial clamping energy necessary to ensure that the parts will not move relative to each other during operation without even approaching the elastic limit of the fasteners. Thus, the possibility of failure due to overstressing of the fasteners or components is exceedingly remote, providing improved reliability.

It will also be appreciated that each of the foregoing advantages have been accomplished in a structure employing only an annular band of hard metal as opposed to prior art structures wherein the band and the crown are integrally formed of a hard, and relatively heavy metal, thereby maintaining the advantages associated with the use of light-weight piston assemblies.

What is claimed is:

1. A piston assembly comprising:

a generally cylindrical piston body having a crown and a depending skirt and being formed of a light-weight metal;

a stepped, peripheral groove in said body adjacent the crown defining a first step opening to the crown and a second step between said first step and said skirt, said first step having a lesser diameter than said second step;

a ring groove protection band formed of a hard metal and having at least one peripheral groove adapted to receive a compression ring received in said groove in said body and in said second step thereof;

a ring-like annular retainer formed of a light-weight metal received in said groove in said body and in said first step thereof and, together with said ring groove protection band, substantially filling said groove in said body;

a bore extending through said body in said skirt and adapted to receive a wrist pin;

means including a plurality of elongated, threaded fasteners extending through said body radially inwardly of said second step from at least said bore to said crown at said first step therein and securing said retainer to said crown for sandwiching and clamping said ring groove protection band in said second step between said body and said retainer, and said body being hollow and including a plurality of generally axially extending, radially inwardly directed, hollow bosses located to each side of said wrist pin receiving bore, said threaded fasteners extending through said hollow bosses substantially the entire length of said body.

* * * * *